United States Patent
McBride et al.

(10) Patent No.: US 10,717,607 B2
(45) Date of Patent: Jul. 21, 2020

(54) TURNOVER MECHANISM OF A CONVEYOR SYSTEM OF A BLAST WHEEL MACHINE

(71) Applicant: WHEELABRATOR GROUP, INC., Golden, CO (US)

(72) Inventors: Shawn McBride, Grimsby (CA); David Allen Hannusch, Rockwood (CA); Ronald F C Wright, Burlington (CA)

(73) Assignee: WHEELABRATOR GROUP, INC., Golden, CO (US)

( * ) Notice: Subject to any disclaimer, the term of this patent is extended or adjusted under 35 U.S.C. 154(b) by 0 days.

(21) Appl. No.: 16/070,901

(22) PCT Filed: Feb. 17, 2016

(86) PCT No.: PCT/US2016/018261
§ 371 (c)(1),
(2) Date: Jul. 18, 2018

(87) PCT Pub. No.: WO2017/142531
PCT Pub. Date: Aug. 24, 2017

(65) Prior Publication Data
US 2019/0023496 A1   Jan. 24, 2019

(51) Int. Cl.
*B65H 9/08* (2006.01)
*B65G 47/248* (2006.01)
*B24C 3/08* (2006.01)

(52) U.S. Cl.
CPC ............ *B65G 47/248* (2013.01); *B24C 3/083* (2013.01); *B24C 3/086* (2013.01)

(58) Field of Classification Search
CPC ...... B05B 13/0235; B65H 2301/33214; B65G 47/252; B65G 47/248; B65G 57/08; B65G 47/22; B65G 47/90; B23Q 7/04; B08B 9/44; E05D 3/122; E05D 15/242; E04H 4/082; E06B 3/486; E04B 1/344
See application file for complete search history.

(56) References Cited

U.S. PATENT DOCUMENTS 2,865,516 A    12/1958   Hedderich
4,050,574 A *   9/1977   Chenevard ............... A23G 1/28
                                              198/458

(Continued)

FOREIGN PATENT DOCUMENTS

GB       2338468 A    12/1999

OTHER PUBLICATIONS

Notification of Transmittal of the International Search Report and the Written Opinion of the International Searching Authority from corresponding PCT/US2016/018261 dated Apr. 21, 2016.

*Primary Examiner* — Gregory W Adams
(74) *Attorney, Agent, or Firm* — Lando & Anastasi, LLP

(57) ABSTRACT

A turnover mechanism is configured to receive and flip over parts delivered by an in-feed conveyor to an out-feed conveyor. The turnover mechanism includes a frame and a gripper assembly coupled to the frame. The gripper assembly is configured to secure and move a part having one surface treated from the in-feed conveyor. The turnover mechanism further includes a flipper assembly coupled to the frame, the flipper assembly being configured to rotate and deliver the part to the out-feed conveyor with an opposite surface of the part exposed for treatment.

14 Claims, 7 Drawing Sheets

(56) References Cited

U.S. PATENT DOCUMENTS

| | | | | |
|---|---|---|---|---|
| 4,135,619 | A | * | 1/1979 | Cerboni .............. A23G 7/0037 198/471.1 |
| 4,921,387 | A | | 5/1990 | Bennington |
| 5,336,029 | A | * | 8/1994 | Kato ................... B65G 47/914 118/719 |
| 5,415,267 | A | * | 5/1995 | Sato ................... B65G 47/1407 198/380 |
| 5,435,688 | A | | 7/1995 | Tokunaga et al. |
| 5,895,192 | A | * | 4/1999 | Parnell, Sr. ........... B29C 31/006 198/409 |
| 6,062,799 | A | * | 5/2000 | Han .................... H05K 7/1415 198/409 |
| 6,186,736 | B1 | * | 2/2001 | Lust ................... B29C 31/006 414/800 |
| 6,297,075 | B1 | * | 10/2001 | Odajima ........... H01L 21/67132 438/110 |
| 6,651,800 | B2 | * | 11/2003 | Baclija .................. B65B 35/58 198/382 |
| 7,603,765 | B2 | * | 10/2009 | Niklas .............. H01L 21/67144 29/739 |
| 8,037,996 | B2 | * | 10/2011 | Cheng .................. B65G 47/91 198/468.3 |
| 8,167,524 | B2 | * | 5/2012 | Cheng ............. H01L 21/67271 356/237.5 |
| 8,725,285 | B2 | * | 5/2014 | Irie ...................... B25J 9/1687 29/407.04 |
| 9,457,963 | B2 | * | 10/2016 | Yang .................... B65G 47/22 |
| 2008/0261504 | A1 | | 10/2008 | Busch |

* cited by examiner

TURNOVER MECHANISM OF A CONVEYOR SYSTEM OF A BLAST WHEEL MACHINE

CROSS-REFERENCE TO RELATED APPLICATIONS

This application is a U.S. National Stage Application under 35 U.S.C. § 371 of International Application No. PCT/US2016/018261, filed Feb. 17, 2016, titled TURNOVER MECHANISM OF A CONVEYOR SYSTEM OF A BLAST WHEEL MACHINE, which is hereby incorporated herein by reference in its entirety.

BACKGROUND OF THE DISCLOSURE

1. Field of the Disclosure

The present disclosure relates generally to abrasive blast wheels and methods for cleaning or treating surfaces of work pieces, and more particularly to a turnover mechanism of a conveyor system of a centrifugal blast wheel machine, which is specifically designed to turn over a connecting rod requiring treatment.

2. Discussion of Related Art

Centrifugal blast wheel machines generally include a rotatable wheel having a plate or a pair of spaced plates that carry radially extending blades. Particulate matter is discharged from a center of the blast wheel onto rotating surfaces of the blades, which propel the particulate matter against surfaces of a work piece to be cleaned or treated. Specifically, blast media is fed from a feed spout into a rotating impeller situated within a control cage at the center of the blast wheel. The media is fed from the impeller, though an opening in the control cage, and onto the heels or the inner ends of the rotating blades. The media travels along the faces of the blades and is thrown from the tips of the blades at the work piece surfaces to be treated.

Currently available blast wheel machines are fitted with a chute to overturn and transfer the part from one conveyor to another conveyor, thereby achieving the objective of exposing top and bottom surfaces to a blast wheel operation, such as peening. The chute spirals through 180 degrees as the part descends within the chute, which turns the part over and delivers the part to the second conveyor. However, the part transfer is unpredictable, and as the chute wears, the chute requires constant maintenance and adjustment. In addition, the part can at times become lodged within the chute, thereby causing a machine jam and consequential operational down time.

SUMMARY OF THE DISCLOSURE

One aspect of the present disclosure is directed to a turnover mechanism configured to receive and flip over parts delivered by an in-feed conveyor to an out-feed conveyor. In one embodiment, the turnover mechanism comprises a frame and a gripper assembly coupled to the frame. The gripper assembly is configured to secure and move a part having one surface treated from the in-feed conveyor. The turnover mechanism further comprises a flipper assembly coupled to the frame, the flipper assembly being configured to rotate and deliver the part to the out-feed conveyor with an opposite surface of the part exposed for treatment.

Embodiments of the turnover mechanism further may include configuring the gripper assembly to include a carriage device coupled to the frame and a gripper head coupled to the carriage device. The gripper head may include a pair of gripper fingers configured to grab and secure the part. The gripper fingers may be manipulated to move toward one another to secure the part in between the gripper fingers and to move away from one another when releasing the part from the gripper fingers. The carriage device may be configured to move the gripper head in an up-and-down direction (Z axis direction) and linearly in a direction parallel to a direction of the in-feed conveyor (X axis direction). The carriage device may include an X axis gantry mounted on the frame and a Z axis gantry mounted on an end of the X axis gantry, with the Z axis gantry being configured to move the gripper fingers toward the part to secure the part and the X axis gantry being configured to move the Z axis gantry and the part along the X axis direction. The flipper assembly may include a yoke rotatably coupled to a rotational drive, with the rotational drive being mounted on the frame. The yoke may be positioned adjacent the in-feed conveyor and configured to receive the part from the flipper assembly. The yoke may include a collar mounted on the rotational drive, and two arms extending from the collar. A first arm may include a first pair of flipper fingers configured to grab and secure the part, and a second arm may include a second pair of flipper fingers configured to grab and secure another part. Each of the first pair of flipper fingers and the second pair of flipper fingers may be manipulated to move toward one another to secure the part in between the flipper fingers and to move away from one another when releasing the part from flipper fingers. The rotational drive may be configured to position a first arm adjacent the in-feed conveyor and to position a second arm adjacent the out-feed conveyor. The rotational drive may rotate the yoke to position the second arm adjacent the in-feed conveyor and to position the first arm adjacent the out-feed conveyor. The in-feed conveyor may include at least one pusher finger that extends through a slot and into an opening of the part to move the part in a linear direction towards the turnover mechanism. The out-feed conveyor may include at least one pusher finger that extends through a slot and into an opening of the part to move the part in a linear direction towards another blast wheel machine.

Another aspect of the disclosure is directed to a method of turning over a part requiring treatment of both sides of the part. In one embodiment, the method comprising: moving a part along an in-feed conveyor to a turnover mechanism, the part having a first, upwardly facing surface treated and a second, downwardly facing surface untreated; removing the part from the in-feed conveyor; placing the part on an arm of a flipper assembly of the turnover mechanism; rotating the part 180 degrees; and placing the part on an out-feed conveyor with the second surface of the part facing upwardly.

Embodiments of the method further may include securing the part on the arm of the flipper assembly. The flipper assembly may include a yoke rotatably coupled to a rotational drive, the rotational drive being mounted on the frame, with the yoke being positioned adjacent the in-feed conveyor and configured to receive the part from the flipper assembly. The yoke may include a collar mounted on the rotational drive, and two arms extending from the collar. A first arm may include a first pair of flipper fingers configured to grab and secure the part, and a second arm may include a second pair of flipper fingers configured to grab and secure another part. Removing the part from the in-feed conveyor and placing the part on the arm of the flipper assembly may include securing the part with a gripper assembly. The gripper assembly may include a carriage device coupled to the frame and a gripper head coupled to the carriage device. The gripper head may include a pair of gripper fingers configured to grab and secure the part, with the gripper fingers being manipulated to move toward one another to secure the part in between the gripper fingers and to move away from one another when releasing the part from the gripper fingers.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
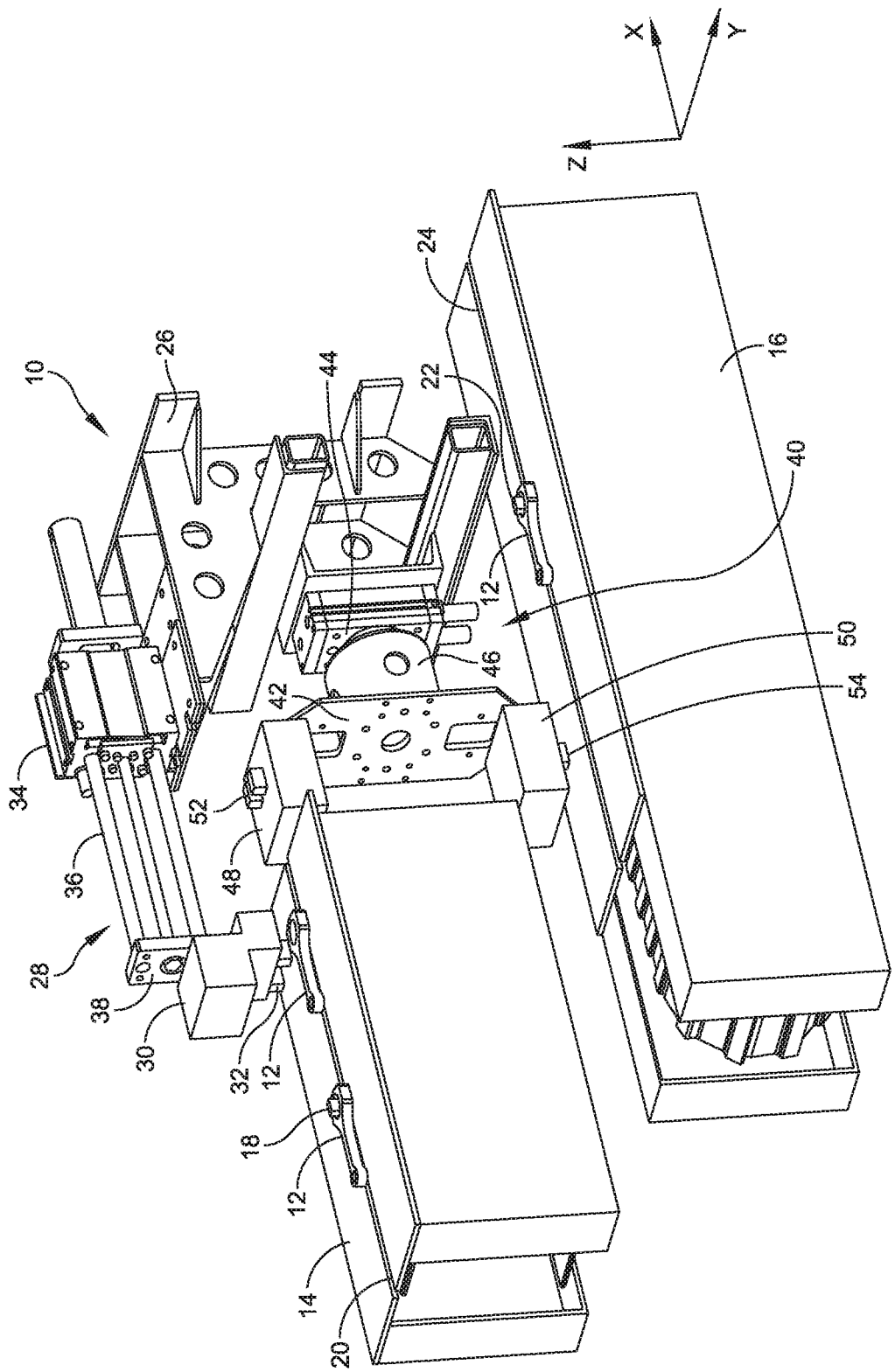
FIG. 1 is a schematic perspective representation of a turnover mechanism that forms part of a conveyor system between adjacent blast wheel machines, showing a connecting rod being delivered by an in-feed conveyor to a gripper assembly.

A typical blast wheel machine includes a housing, which is designed to house the components of the centrifugal blast wheel machine. The centrifugal blast wheel machine further includes a rotating impeller supported by a drive shaft, a control cage assembly, which surrounds the impeller, and a blast wheel assembly, which receives the control cage assembly. A motor is provided to drive the rotation of the impeller and the blast wheel assembly. The arrangement is such that blast media is fed from a feed spout into the rotating impeller, which is driven by the motor. By contact with vanes of the rotating impeller (as well as with other particles of media already in the impeller), blast media particles are accelerated, giving rise to a centrifugal force that moves the particles in radial direction, away from the axis of the impeller. The blast media particles, now moving in a generally circular direction as well as outwards, move through openings formed in the impeller into a space between the impeller and a control cage of the control cage assembly, still being carried by the movement of the impeller vanes (also known as impellor dams) and the other particles.

When the blast media particles that have passed though the impeller openings into the space between the impeller and the control cage assembly reach an opening provided in the control cage assembly, rotational and centrifugal forces move the particles through the opening and onto ends of the vanes. The control cage assembly functions to meter a consistent and appropriate amount of blast media onto the blades of the blast wheel assembly. As the vanes of the impeller rotate, the blast media particles are moved along their lengths and accelerate until they reach the ends of the vanes and thrown from the ends of the vanes. Typically, the impeller will be made of a ferrous material, such as cast or machined iron or steel, although other materials may also be appropriate.

The blast wheel assembly of the centrifugal blast wheel machine includes a hub or wheel and a plurality of blades to throw blast media introduced into the wheel assembly to treat the work piece contained within the housing. The arrangement is such that the impeller is positioned about an axis of the wheel of the blast wheel assembly, with the impeller having a media inlet at one end adapted to receive blast media and a plurality of impeller media outlets constructed and arranged to allow egress of blast media upon rotation of the impeller. The control cage of the control cage assembly surrounds the impeller in a position in which the media outlet of the control cage assembly is adapted for passage of blast media to the heel ends of the blades of the blast wheel assembly. As mentioned above, the motor is coupled to the impeller and to the blast wheel assembly to drive the rotation of the impeller and the wheel assembly.

A typical centrifugal blast wheel machine is used to treat a surface of a work piece by projecting blast media at the surface. The treatment may be in the nature of cleaning, peening, abrading, eroding, de-burring, de-flashing, and the like, and the blast media typically consists of solid particles such as shot, grit, segments of wire, sodium bicarbonate, or other abrasives, depending on the surface being treated and/or the material being removed from the surface.

Embodiments of the present disclosure are directed to a system used to treat parts, and more particularly to a conveyor system having a turnover mechanism that is used to flip parts, e.g., connecting rods, that are to be treated by two adjacently placed blast wheel machines, with one blast wheel machine treating one surface of the part and another blast wheel machine treating an opposing surface of the part. The conveyor system is designed to convey the parts through blast peening shot streams provided by the two (or more) blast wheel machines. The conveyor may be arranged on two levels, with an in-feed conveyor being elevated relative to an out-feed conveyor. Each part must be exposed to the treating process, e.g., preening, on both top and bottom surfaces. The turnover mechanism of embodiments of the present disclosure are configured to manipulate and transfer the part from the in-feed conveyor to the out-feed conveyor, which delivers the part to another blast wheel machine to achieve the desired treating effect on the remaining surfaces.

Referring to the drawings, and more particularly to FIG. 1, a turnover mechanism of embodiments of the present disclosure is generally indicated at 10. As shown, the turnover mechanism 10 is configured to receive and flip over parts 12, such as connecting rods, delivered by an in-feed conveyor 14 to an out-feed conveyor 16. The in-feed conveyor 14 is configured to deliver component parts 12 from a blast wheel machine, such as the blast wheel machine described herein, to the turnover mechanism 10. As shown, the in-feed conveyor 14 includes at least one pusher finger 18 that extends through a slot 20 in the in-feed conveyor and into an opening of the part 12 to move the part in a linear direction towards the turnover mechanism 10. The pusher finger 18 can be driven by any suitable mechanism, such a chain drive assembly including a chain and a pair of sprockets, one of which is driven by a motor.

The out-feed conveyor 16 is configured to deliver the component parts 12 to another blast wheel machine to treat opposing surfaces of the parts. The out-feed conveyor 16 also includes at least one pusher finger 22 that extends through a slot 24 in the out-feed conveyor and into an opening of the part 12 to move the part in a linear direction towards another blast wheel machine. It should be understood that the two blast wheel machines described herein may in fact be one machine having two separate treatment areas, e.g., peening zones.

The turnover mechanism 10 includes a frame 26 that is suitably secured in place with respect to the in-feed conveyor 14, the out-feed conveyor 16 and the blast wheel machines. The turnover mechanism 10 further includes a gripper assembly, generally indicated at 28, that is secured to the frame 26. As shown, the gripper assembly 28 includes a gripper module or head 30 having a pair of gripper fingers 32 configured to grab and secure the part 12. The gripper fingers 32 are manipulated to move toward one another to secure the part 12 in between the gripper fingers and to move away from one another when releasing the part from the gripper fingers.

The gripper assembly 28 further includes a carriage device 34, which is secured to the frame 26 and the gripper head 30, to move the gripper head in an up-and-down direction (Z axis direction) and linearly in a direction parallel to a direction of the in-feed conveyor 14 (X axis direction). As shown, the carriage device 34 includes an X axis gantry 36 mounted on the frame 26 and a Z axis gantry 36 mounted on an end of the X axis gantry. The gripper head 30 is mounted on the Z axis gantry 36. As will be described below, the Z axis gantry 36 is configured to move the gripper head 30 and the gripper fingers 32 toward the part 12 to secure the part, and the X axis gantry 36 is configured to move the gripper head including the Z axis gantry and the part along the X axis direction away from the in-feed conveyor 14.

The gripper assembly 28 is configured to secure and move the part 12 to a flipper assembly, generally indicated at 40. As shown, the flipper assembly 30 includes a yoke 42 rotatably coupled to a rotational drive 44, which is mounted on the frame 26. The yoke 42 of the flipper assembly 40 is positioned adjacent the in-feed conveyor 14 and configured to receive the part 12 from the flipper assembly. The yoke 42 includes a collar 46 mounted on the rotational drive 44, and two arms 48, 50 extending from the collar. Arm 48 includes a first pair of flipper fingers 52 configured to grab and secure the part 12, and arm 50 includes a second pair of flipper fingers 54 configured to grab and secure the part. As with the gripper fingers 32, the first pair of flipper fingers 52 and the second pair of flipper fingers 54 are each manipulated to move toward one another to secure the part 12 in between the flipper fingers and to move away from one another when releasing the part from the flipper fingers.

The rotational drive 44 is configured to position arm 48 adjacent the in-feed conveyor 14 and to position arm 50 adjacent the out-feed conveyor 16, which is illustrated in claim 1. As will be described in greater detail below, during operation, the rotational drive 44 can rotate the yoke 42 to position arm 48 adjacent the out-feed conveyor 16 and to position arm 50 adjacent the in-feed conveyor 14. Sensors may be provided to determine the location of the arms 48, 50 with respect to the in-feed conveyor 14 and the out-feed conveyor 16.

Figure 7:
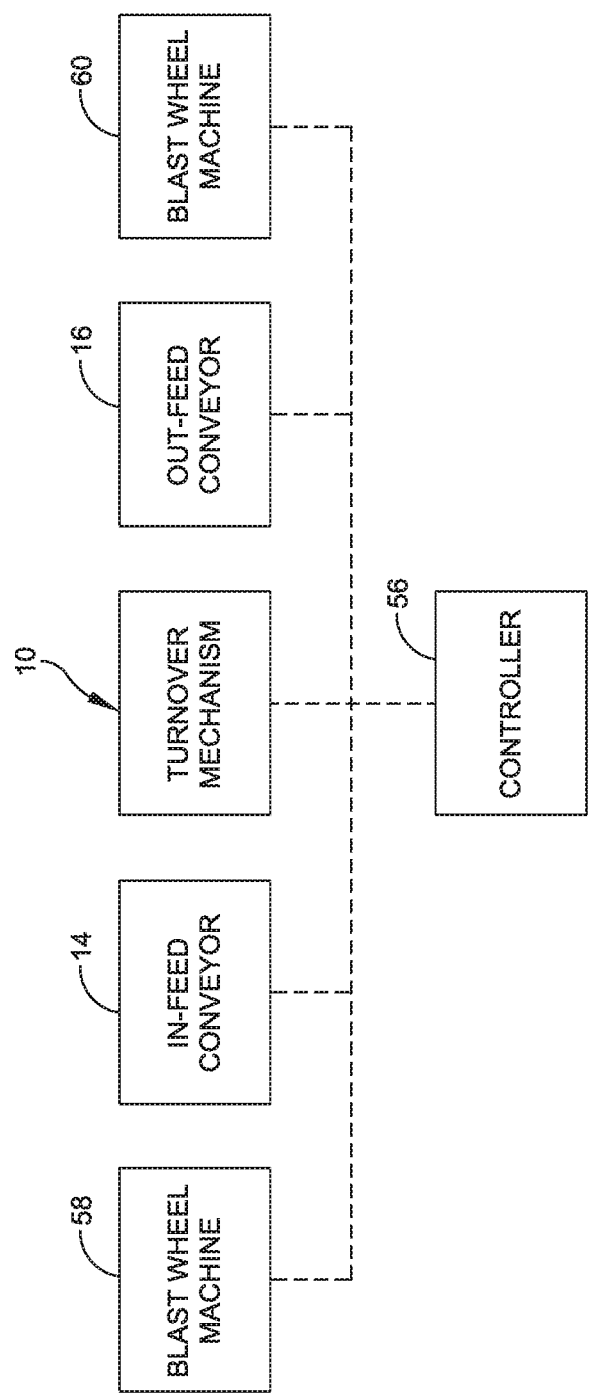
FIG. 7 is a schematic representation of a line used to treat parts.

Referring to FIG. 7, in certain embodiments, the turnover mechanism 10 may be coupled to a controller 56, which controls the operation of not only the turnover mechanism, but also the other components of the system, including blast wheel machines 58, 60 and the in-feed and out-feed conveyors 14, 16 of the conveyor system. In one embodiment, the controller 56 may include a user interface, which may be configured to alert an operator of an issue with the treatment of a part as detected by the sensors. In yet another embodiment, the user interface may include a lighted warning indicator and/or an audible alarm. The user interface system may include various types of devices and/or systems that are configured to communicate information to and from the controller 56, and enable one or more users of the system to control, monitor, and otherwise interact with the controller.

The sequence of operation of the turnover mechanism 10 is described as follows. Still referring to FIG. 1, the parts 12, e.g., connecting rods, are moved into position after being treated on one side by a blast wheel machine, e.g., blast wheel machine 58 (FIG. 7), which are delivered to the in-feed conveyor 14. The in-feed conveyor 14 operates continuously using the pusher fingers 18 to move the parts 12. Infrared sensors may be provided to detect each part 12 as the part moves into position on the in-feed conveyor 14.

Figure 2:
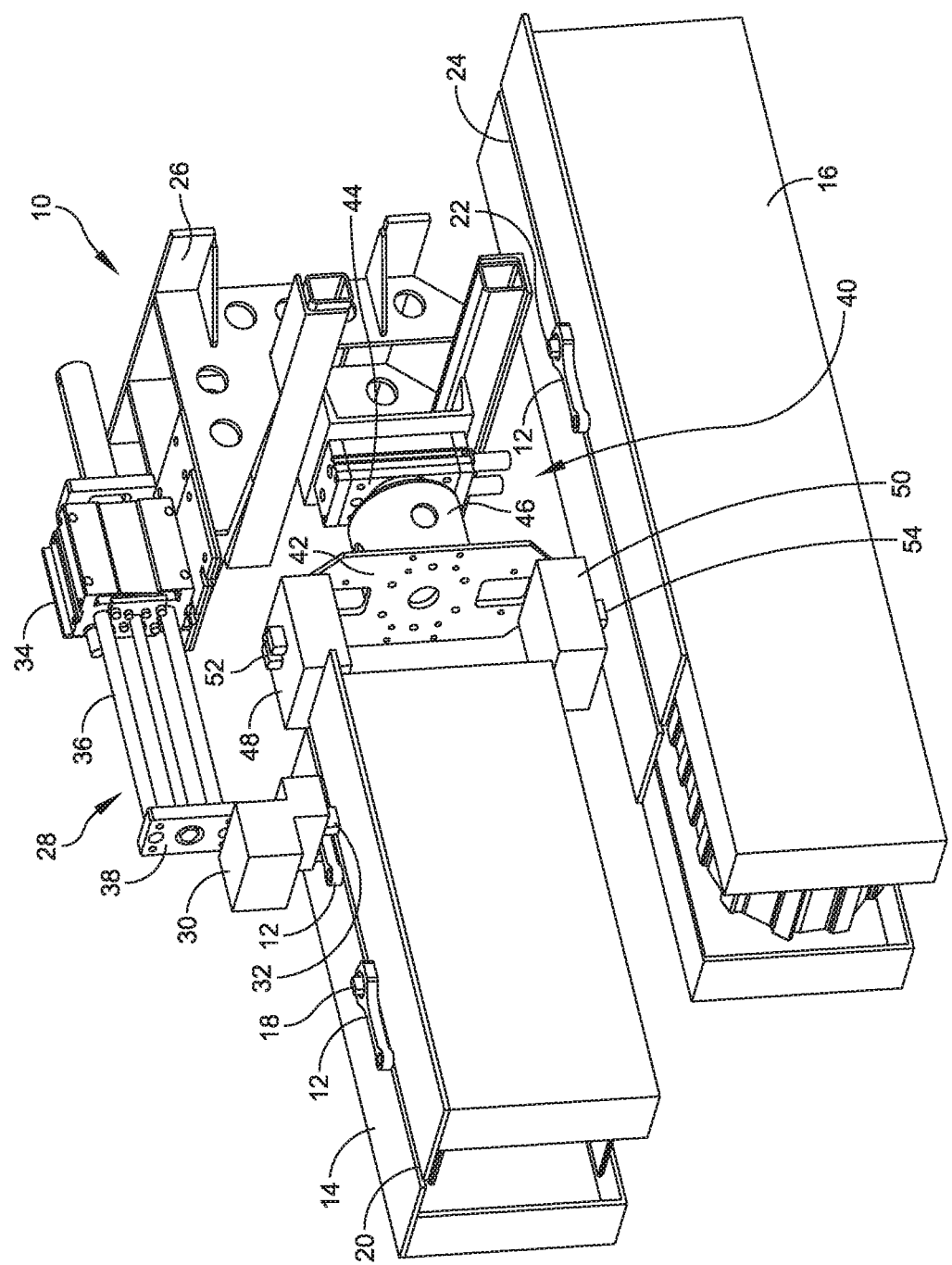
FIG. 2 is a schematic perspective representation of the gripper assembly securing the connecting rod.

Referring to FIG. 2, once the sensors detect the part 12 in position at the end of the in-feed conveyor 14, the gripper assembly 28 is activated, e.g., by an air cylinder, to move the gripper fingers 32 of the gripper head 30 down toward the part on the in-feed conveyor. The gripper fingers 32 of the gripper head 30 then secures the middle of the part 12 on either side of the part with two gripper fingers that are actuated by the gripper assembly 28.

Figure 3:
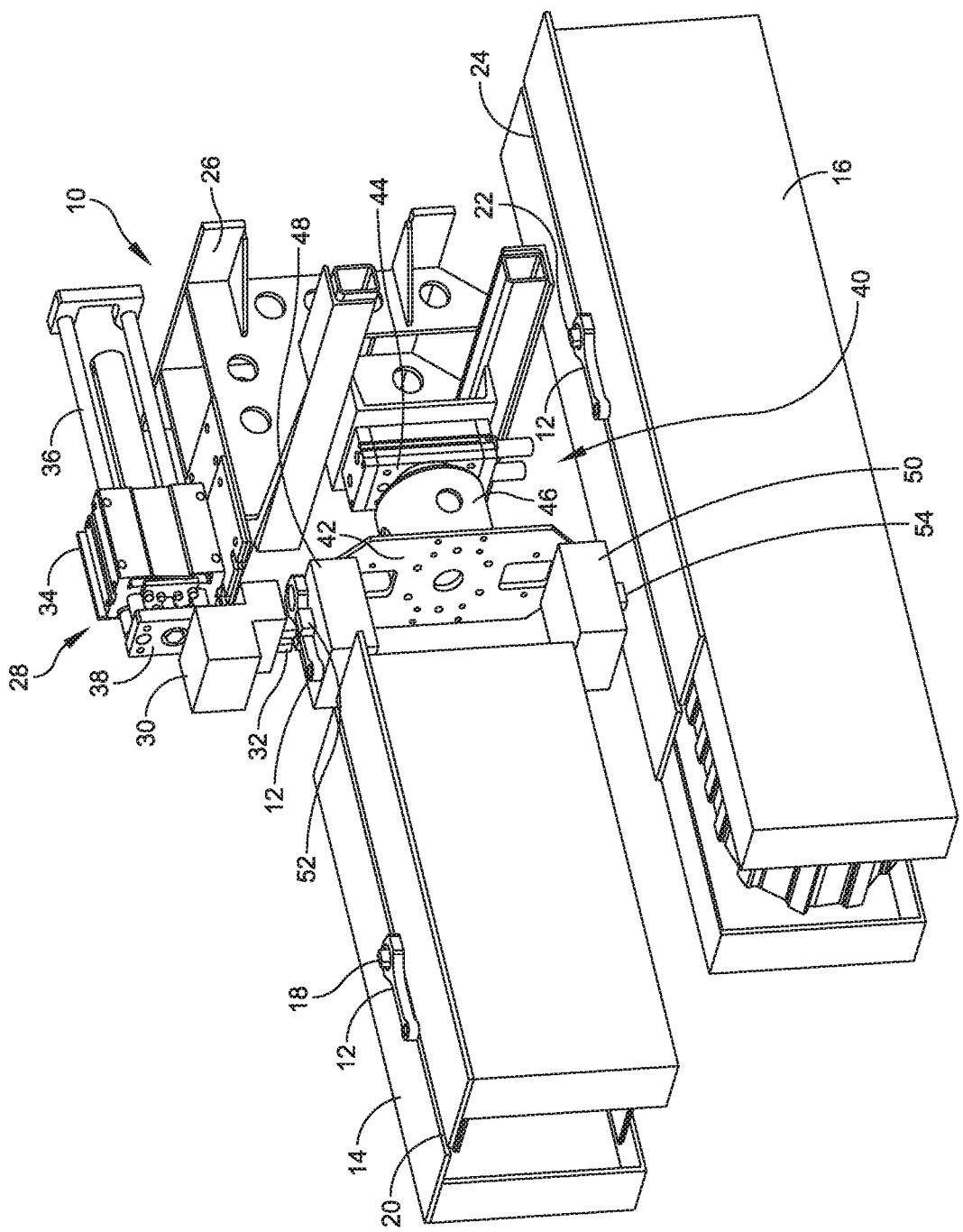
FIG. 3 is a schematic perspective representation of the gripper assembly delivering the connecting rod to a flipper assembly of the turnover mechanism.

Referring to FIG. 3, once the part 12 has been picked by the gripper fingers 32 of the gripper head 30, the gripper head is moved upward by the Z axis gantry 38 and moved away from the in-feed conveyor 14 by the X axis gantry 36, which retracts the gripper head longitudinally so that the part is positioned directly over one of the arms 48, 50 of the flipper assembly 40. Once in position, the gripper fingers 32 securing the part 12 are opened, and the part falls a short distance onto the arm 48 of the flipper assembly 40 and between the first pair of flipper fingers 52. The first pair of flipper fingers 52 of the flipper assembly 40 is then actuated, and secures the middle of the part 12 on either side of the part similar to the gripper fingers 32 of the gripper assembly 28.

Figure 4:
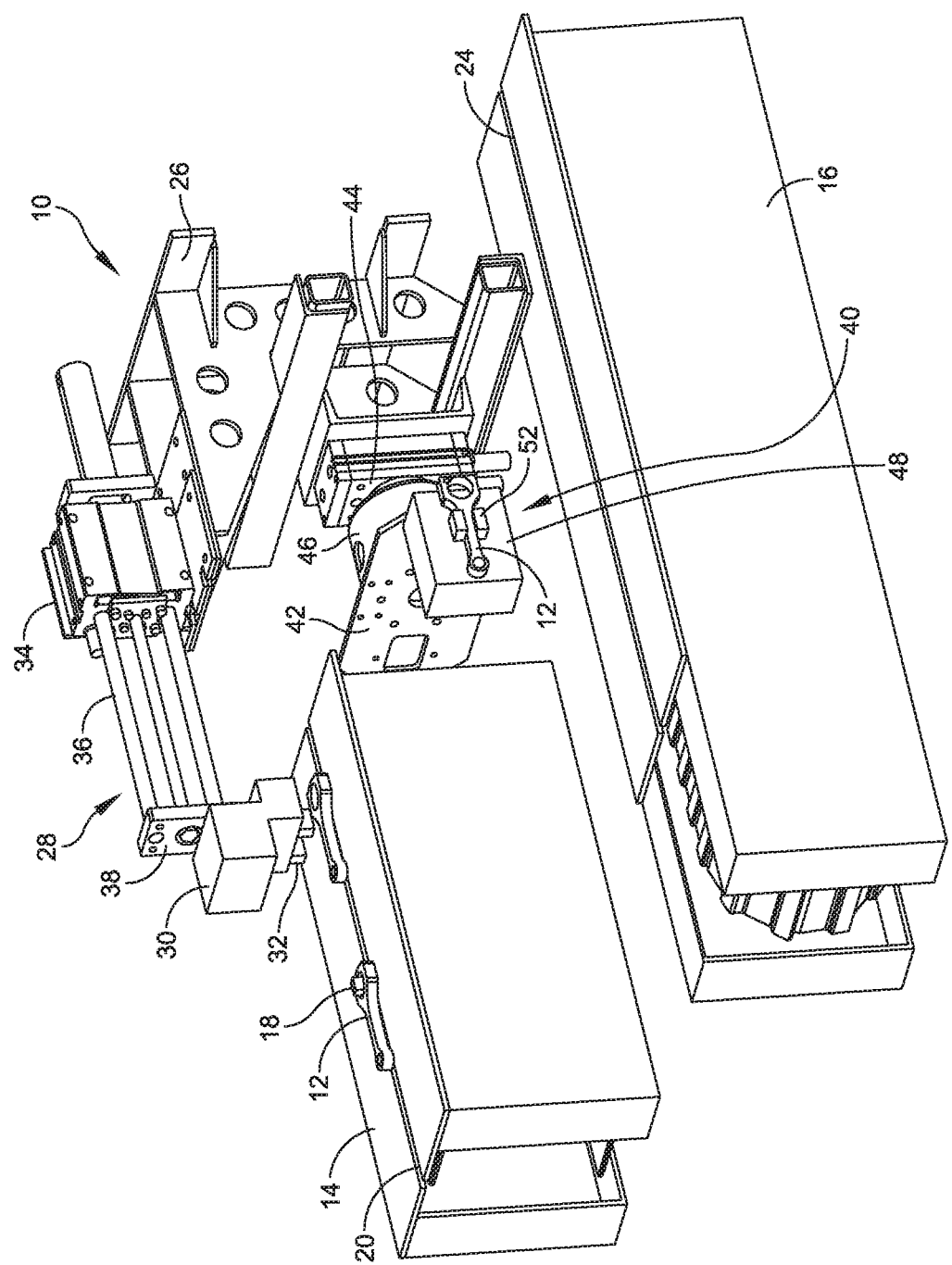
FIG. 4 is a schematic perspective representation of the flipper assembly rotating the connector rod.

Referring to FIG. 4, once the first pair of flipper fingers 52 of the flipper assembly 40 has secured the part 12, the yoke 42 of the flipper assembly rotates 180 degrees by operating the rotational drive 44. The flipper assembly 40 is shown in FIG. 4 rotating through 90 degrees, which is about half the 180 degrees rotation.

Figure 5:
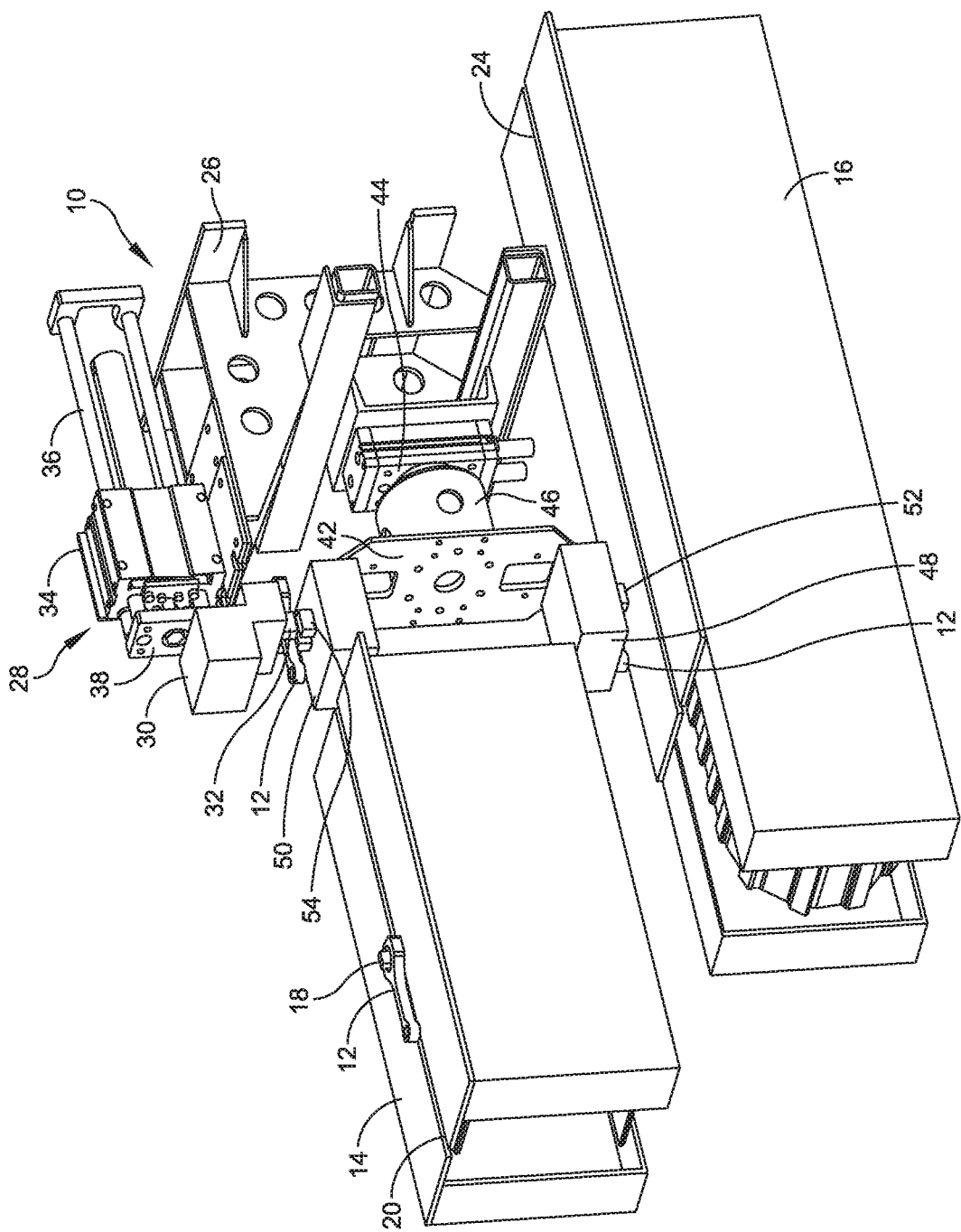
FIG. 5 is a schematic perspective representation of the flipper assembly fully rotated.

Referring to FIG. 5, when the flipper assembly 40 has rotated the arms 48, 50 (180 degrees), the part 12 that is gripped by the first pair 52 of flipper fingers of the arm 48 of the flipper assembly is now at a lower position in a position in which the part is rotated down to unload onto the out-feed conveyor 16. In this position, the other arm 50 is now located at an upper position, and prepared to receive a part from the gripper assembly 28, which is returning with the next part delivered from the in-feed conveyor 14.

Figure 6:
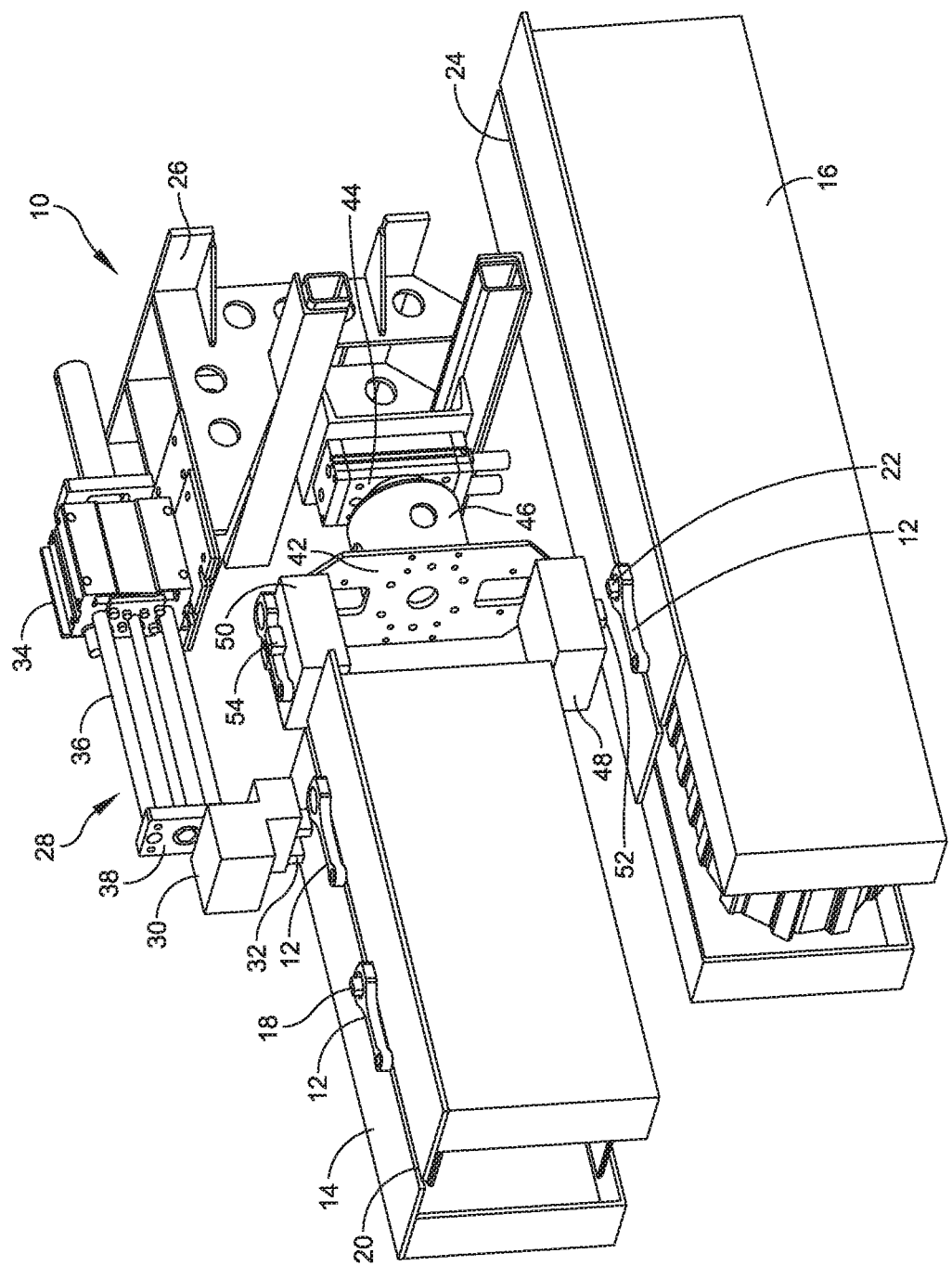
FIG. 6 is a schematic perspective representation of the flipper assembly delivering the connector rod to an out-feed conveyor.

Referring to FIG. 6, a sensor detects the next pusher finger 22 of the out-feed conveyor 16, and signals the first pair of flipper fingers 52 of the flipper assembly to release the part 12 so that the part falls a short distance on the out-feed conveyor 16, with a larger ring of the part being positioned over an end of the pusher finger so that the pusher finger "drags" the part downstream to the second blast wheel machine 60 to have an opposite side of the part treated, e.g., peened. At this point, the part 12 has been effectively flipped over 180 degrees so that both sides of the part are equally treated. At the same time, the second pair of flipper fingers 54 of the second arm 50 of the flipper assembly 40 is signaled to close and grip another part 12 deposited by the gripper assembly 28. Once a proximity switch indicates that the first pair of flipper fingers 52 of the first arm 48 of the flipper assembly 40 is open and that the part 12 has dropped on the out-feed conveyor 16, the arms 48, 50 of the flipper assembly are rotated by the yoke 42 and the rotational drive 44 (180 degrees), and the process repeats.

In certain, embodiments, the turnover mechanism 10 is capable of picking a part from a conveying apparatus, overturning the part and delivering the part to a second conveying apparatus within 3.5 seconds. The turnover mechanism 10 is a self-contained assembly, and can be removed from the machine as one unit to facilitate maintenance or overhaul, thus allowing the remaining equipment, through the use of a second identical turnover mechanism, to continue operations with minimal operational down time. The turnover mechanism 10 does not require constant adjustment based on wear inside the mechanism.

Thus, it should be observed that the turnover mechanism 10 can be arranged in a manner so as to remove one part from a conveyor system, alter the attitude of the part by 180 degrees, and then discharge the part onto a second conveyor mechanism. It should be noted that the parts, e.g., connecting rods, may vary in size and weight. It should be further observed that the turnover mechanism can rotate the parts in a manner that is repeatable, dependable, and predictable within a set time.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A turnover mechanism is configured to receive and flip over parts, the turnover mechanism comprising:
    an in-feed conveyor configured to transport a component part having two surfaces, a treated surface that faces upwardly on the -infeed conveyor and an untreated surface that faces downwardly on the in-feed conveyor;
    a frame positioned proximate the in-feed conveyor;
    a gripper assembly coupled to the frame, the gripper assembly being configured to secure and move the component part from the in-feed conveyor;
    a flipper assembly coupled to the frame, the flipper assembly being configured to receive the component part from the gripper assembly and to rotate and deliver the component part in a position in which the untreated surface faces upwardly and the treated surface faces downwardly; and
    an out-feed conveyor configured to receive the component part from the flipper assembly and to transport the component part away from the flipper assembly, the in-feed conveyor being elevated relative to the out-feed conveyor,
    wherein an end portion of the in-feed conveyor and a beginning portion of the out-feed conveyor are substantially aligned with one another,
    wherein the gripper assembly includes a carriage device coupled to the frame and a gripper head coupled to the carriage device, and
    wherein the gripper head includes a pair of gripper fingers configured to grab and secure the part, the gripper fingers being manipulated to move toward one another to secure the part in between the gripper fingers and to move away from one another when releasing the part from the gripper fingers.

2. The turnover mechanism of claim 1, wherein the carriage device is configured to move the gripper head in an up-and-down direction (Z axis direction) and linearly in a direction parallel to a direction of the in-feed conveyor (X axis direction).

3. The turnover mechanism of claim 2, wherein the carriage device includes an X axis gantry mounted on the frame and a Z axis gantry mounted on an end of the X axis gantry, the Z axis gantry being configured to move the gripper fingers toward the part to secure the part and the X axis gantry being configured to move the Z axis gantry and the part along the X axis direction.

4. The turnover mechanism of claim 1, wherein the flipper assembly includes a yoke rotatably coupled to a rotational drive, the rotational drive being mounted on the frame.

5. The turnover mechanism of claim 4, wherein the yoke is positioned adjacent the in-feed conveyor and configured to receive the part from the flipper assembly.

6. The turnover mechanism of claim 5, wherein the yoke includes a collar mounted on the rotational drive, and two arms extending from the collar.

7. The turnover mechanism of claim 6, wherein a first arm includes a first pair of flipper fingers configured to grab and secure the part, and a second arm includes a second pair of flipper fingers configured to grab and secure another part.

8. The turnover mechanism of claim 7, wherein each of the first pair of flipper fingers and the second pair of flipper fingers are manipulated to move toward one another to secure the part in between the flipper fingers and to move away from one another when releasing the part from flipper fingers.

9. The turnover mechanism of claim 4, wherein the rotational drive is configured to position a first arm adjacent the in-feed conveyor and to position a second arm adjacent the out-feed conveyor.

10. The turnover mechanism of claim 9, wherein the rotational drive rotates the yoke to position the second arm adjacent the in-feed conveyor and to position the first arm adjacent the out-feed conveyor.

11. The turnover mechanism of claim 1, wherein the in-feed conveyor includes at least one pusher finger that extends through a slot and into an opening of the part to move the part in a linear direction towards the turnover mechanism, and wherein the out-feed conveyor includes at least one pusher finger that extends through a slot and into an opening of the part to move the part in a linear direction towards another blast wheel machine.

12. A method of turning over a part requiring treatment of both sides of the part, the method comprising:
    moving a part along an in-feed conveyor to a turnover mechanism, the part having a first, upwardly facing surface treated and a second, downwardly facing surface untreated;
    removing the part from the in-feed conveyor;
    placing the part on an arm of a flipper assembly of the turnover mechanism;
    rotating the part 180 degrees; and
    placing the part on an out-feed conveyor with the second surface of the part facing upwardly,
    wherein the in-feed conveyor is elevated relative to the out-feed conveyor,
    wherein an end portion of the in-feed conveyor and a beginning portion of the out-feed conveyor are substantially aligned with one another, wherein removing the part from the in-feed conveyor and placing the part on the arm of the flipper assembly includes securing the part with a gripper assembly, wherein the gripper assembly includes a carriage device coupled to the frame and a gripper head coupled to the carriage device, and wherein the gripper head includes a pair of gripper fingers configured to grab and secure the part, the gripper fingers being manipulated to move toward one another to secure the part in between the gripper fingers and to move away from one another when releasing the part from the gripper fingers.

13. A method of turning over a part requiring treatment of both sides of the part, the method comprising:

moving a part along an in-feed conveyor to a turnover mechanism, the part having a first, upwardly facing surface treated and a second, downwardly facing surface untreated;

removing the part from the in-feed conveyor;

placing the part on an arm of a flipper assembly of the turnover mechanism;

securing the part on the arm of the flipper assembly;

rotating the part 180 degrees; and placing the part on an out-feed conveyor with the second surface of the part facing upwardly, wherein the in-feed conveyor is elevated relative to the out-feed conveyor, wherein an end portion of the in-feed conveyor and a beginning portion of the out-feed conveyor are substantially aligned with one another, wherein the flipper assembly includes a yoke rotatably coupled to a rotational drive, the rotational drive being mounted on the frame, the yoke being positioned adjacent the in-feed conveyor and configured to receive the part from the flipper assembly.

14. The method of claim 13, wherein the yoke includes a collar mounted on the rotational drive, and two arms extending from the collar, and wherein a first arm includes a first pair of flipper fingers configured to grab and secure the part, and a second arm includes a second pair of flipper fingers configured to grab and secure another part.

* * * * *